(12) United States Patent
Harel

(10) Patent No.: US 10,601,529 B2
(45) Date of Patent: Mar. 24, 2020

(54) SUPPRESSING AN UPLINK RADIO FREQUENCY (RF) INTERFERENCE SIGNAL(S) IN A REMOTE UNIT IN A WIRELESS DISTRIBUTION SYSTEM (WDS) USING A CORRECTION SIGNAL(S) RELATIVE TO THE UPLINK RF INTERFERENCE SIGNAL(S)

(71) Applicant: Corning Optical Communications LLC, Charlotte, NC (US)

(72) Inventor: Dror Harel, Hod Hasharon (IL)

(73) Assignee: Corning Optical Communications LLC, Charlotte, NC (US)

( * ) Notice: Subject to any disclaimer, the term of this patent is extended or adjusted under 35 U.S.C. 154(b) by 250 days.

(21) Appl. No.: 15/413,698

(22) Filed: Jan. 24, 2017

(65) Prior Publication Data

US 2018/0212693 A1   Jul. 26, 2018

(51) Int. Cl.
| | | |
|---|---|---|
| *H04B 17/345* | (2015.01) | |
| *H04W 24/02* | (2009.01) | |
| *H04B 1/12* | (2006.01) | |

(52) U.S. Cl.
CPC ......... *H04B 17/345* (2015.01); *H04B 1/123* (2013.01); *H04W 24/02* (2013.01)

(58) Field of Classification Search
CPC .... H04B 1/123; H04B 17/309; H04B 17/336; H04B 17/345; H04B 17/373; H04B 1/109; H04B 1/7105; H04B 1/7107; H04W 24/02
See application file for complete search history.

(56) References Cited

U.S. PATENT DOCUMENTS

| | | | |
|---|---|---|---|
| 8,565,681 B2 | 10/2013 | Kim et al. | |
| 2004/0017843 A1* | 1/2004 | Fitton | H04B 1/7107 375/148 |
| 2010/0048154 A1* | 2/2010 | Rofougaran | H04B 1/109 455/233.1 |
| 2011/0069796 A1* | 3/2011 | Scharf | H04B 1/7105 375/348 |

* cited by examiner

*Primary Examiner* — Khoa Huynh
(74) *Attorney, Agent, or Firm* — C. Keith Montgomery

(57) ABSTRACT

Embodiments of the disclosure relate to suppressing an uplink radio frequency (RF) interference signal(s) in a remote unit in a wireless distribution system (WDS) using a correction signal(s) relative to the uplink RF interference signal(s). A remote unit in a WDS is configured to receive an uplink RF signal including an uplink RF communications signal(s) and an uplink RF interference signal(s). To mitigate adverse impacts of the uplink RF interference signal(s) on the uplink RF communications signal(s), the remote unit generates an RF correction signal(s) based on identified interference characteristics of the uplink RF interference signal. The remote unit combines the RF correction signal(s) with the uplink RF signal to suppress the uplink RF interference signal(s) to a predetermined level. By doing so, it is possible to mitigate the adverse impacts of the uplink RF interference signal(s), thus preserving integrity and quality of the uplink RF communications signal(s).

19 Claims, 8 Drawing Sheets

SUPPRESSING AN UPLINK RADIO FREQUENCY (RF) INTERFERENCE SIGNAL(S) IN A REMOTE UNIT IN A WIRELESS DISTRIBUTION SYSTEM (WDS) USING A CORRECTION SIGNAL(S) RELATIVE TO THE UPLINK RF INTERFERENCE SIGNAL(S)

BACKGROUND

The disclosure relates generally to reducing radio frequency (RF) interference in a wireless distribution system (WDS), such as a distributed antenna system (DAS), and more particularly to reducing RF interference in an uplink RF communications signal(s) in a remote unit in a WDS.

Wireless customers are increasingly demanding digital data services, such as streaming video signals. At the same time, some wireless customers use their wireless communications devices in areas that are poorly serviced by conventional cellular networks, such as inside certain buildings or areas where there is little cellular coverage. One response to the intersection of these two concerns has been the use of DASs. DASs include remote units configured to receive and transmit communications signals to client devices within the antenna range of the remote units. DASs can be particularly useful when deployed inside buildings or other indoor environments where the wireless communications devices may not otherwise be able to effectively receive RF signals from a source.

In this regard, FIG. 1 illustrates distribution of communications services to remote coverage areas 100(1)-100(N) of a wireless distribution system (WDS) provided in the form of a DAS 102, wherein 'N' is the number of remote coverage areas. These communications services can include cellular services, wireless services, such RF identification (RFID) tracking, Wireless Fidelity (Wi-Fi), local area network (LAN), and wireless LAN (WLAN), wireless solutions (Bluetooth, Wi-Fi Global Positioning System (GPS) signal-based, and others) for location-based services, and combinations thereof, as examples. The remote coverage areas 100(1)-100(N) may be remotely located. In this regard, the remote coverage areas 100(1)-100(N) are created by and centered on remote units 104(1)-104(N) connected to a central unit 106 (e.g., a head-end equipment, a head-end controller, or a head-end unit). The central unit 106 may be communicatively coupled to a signal source 108, for example a base transceiver station (BTS) or a baseband unit (BBU). In this regard, the central unit 106 receives downlink communications signals 110D from the signal source 108 to be distributed to the remote units 104(1)-104(N). The remote units 104(1)-104(N) are configured to receive the downlink communications signals 110D from the central unit 106 over a communications medium 112 to be distributed to the respective remote coverage areas 100(1)-100(N) of the remote units 104(1)-104(N). Each of the remote units 104(1)-104(N) may include an RF transmitter/receiver and a respective antenna 114(1)-114(N) operably connected to the RF transmitter/receiver to wirelessly distribute the communications services to client devices 116 within the respective remote coverage areas 100(1)-100(N). The remote units 104(1)-104(N) are also configured to receive uplink communications signals 110U from the client devices 116 in the respective remote coverage areas 100(1)-100(N) to be distributed to the signal source 108. The size of each of the remote coverage areas 100(1)-100(N) is determined by the amount of RF power transmitted by the respective remote units 104(1)-104(N), receiver sensitivity, antenna gain, and RF environment, as well as by RF transmitter/receiver sensitivity of the client devices 116. The client devices 116 usually have a fixed maximum RF receiver sensitivity, so that the above-mentioned properties of the remote units 104(1)-104(N) mainly determine the size of the respective remote coverage areas 100(1)-100(N).

In a non-limiting example, a selected remote unit, such as the remote unit 104(2) among the remote units 104(1)-104(N) for example, receives the uplink communications signal 110U across a wide RF spectrum. For example, the selected remote unit 104(2) may receive the uplink communications signal 110U in an 830-845 MHz band, a 2010-2025 MHz band, or a combination thereof. As such, the selected remote unit 104(2) may receive a strong RF interference signal(s) along with the uplink communications signal 110U. The strong RF interference signal(s) can potentially cause a selected signal processing component(s) (e.g., an analog-to-digital converter) in a reception path of the selected remote unit 104(2) to be overdriven, thus creating noise and distortion that can interfere with the uplink communications signal 110U and lead to a reduced signal-to-noise ratio (SNR) of the uplink communications signal 110U. In this regard, it may be desired to suppress the strong RF interference signal(s) to a desired level to prevent the strong RF interference signal(s) from overdriving the selected signal processing component(s) in the reception path of the selected remote unit.

No admission is made that any reference cited herein constitutes prior art. Applicant expressly reserves the right to challenge the accuracy and pertinency of any cited documents.

SUMMARY

Embodiments of the disclosure relate to suppressing an uplink radio frequency (RF) interference signal(s) in a remote unit in a wireless distribution system (WDS) using a correction signal(s) relative to the uplink RF interference signal(s). A remote unit in a WDS includes an uplink signal path configured to receive and convert an uplink RF signal, which can include an uplink RF communications signal(s) and an uplink RF interference signal(s), into an uplink digital communications signal for distribution to a central unit in the WDS. To mitigate adverse impacts the uplink RF interference signal(s) may have on the uplink RF communications signal(s), the remote unit is configured to suppress the uplink RF interference signal(s) using an RF correction signal(s) relative to the uplink RF interference signal(s). In this regard, the remote unit further includes a correction path and a digital signal processing circuit. The correction path receives and converts the uplink RF signal(s) into an uplink digital signal(s). The digital signal processing circuit analyzes the uplink digital signal(s) to identify interference characteristics (e.g., phase and amplitude) of the uplink RF interference signal(s) and generates a digital correction signal(s) based on the identified interference characteristics. The correction path is further configured to convert the digital correction signal(s) into the RF correction signal(s). The uplink signal path combines the RF correction signal(s) with the uplink RF signal to suppress the uplink RF interference signal(s) to a predetermined level before converting the uplink RF signal(s) into the uplink digital communications signal(s). By suppressing the uplink RF interference signal(s) using the RF correction signal(s) relative to the uplink RF interference signal(s), it is possible to mitigate the adverse impacts of the uplink RF interference signal(s) in the uplink signal path, thus preserving integrity and quality of the uplink RF communications signal(s).

In this regard, in one aspect, a remote unit in a WDS is provided. The remote unit comprises an uplink signal path. The uplink signal path is configured to receive an uplink RF signal comprising at least one uplink RF communications signal and at least one uplink RF interference signal. The uplink signal path is also configured to convert the uplink RF signal into an uplink digital communications signal for distribution to a central unit in the WDS. The remote unit also comprises a correction path communicatively coupled to the uplink signal path. The correction path is configured to receive and convert the uplink RF signal into an uplink digital signal. The remote unit also comprises a digital signal processing circuit communicatively coupled to the uplink signal path and the correction path. The digital signal processing circuit is configured to receive the uplink digital signal from the correction path. The digital signal processing circuit is also configured to analyze the uplink digital signal to identify interference characteristics of the at least one uplink RF interference signal. The digital signal processing circuit is also configured to generate at least one digital correction signal relative to the at least one uplink RF interference signal based on the identified interference characteristics of the at least one uplink RF interference signal. The correction path is further configured to convert the at least one digital correction signal into at least one RF correction signal relative to the at least one uplink RF interference signal and provide the at least one RF correction signal to the uplink signal path. The uplink signal path is further configured to combine the at least one RF correction signal with the uplink RF signal to suppress the at least one uplink RF interference signal to a predetermined level before converting the uplink RF signal into the uplink digital communications signal.

In another aspect, a method for suppressing uplink RF interference signals in a remote unit in a WDS is provided. The method comprises receiving an uplink RF signal to be converted into an uplink digital communications signal in an uplink signal path. The uplink RF signal comprises at least one uplink RF communications signal and at least one uplink RF interference signal. The method also comprises receiving and converting the uplink RF signal into an uplink digital signal in a correction path. The method also comprises analyzing the uplink digital signal to identify interference characteristics of the at least one uplink RF interference signal. The method also comprises generating at least one digital correction signal relative to the at least one uplink RF interference signal based on the identified interference characteristics of the at least one uplink RF interference signal. The method also comprises converting the at least one digital correction signal into at least one RF correction signal in the correction path and providing the at least one RF correction signal to the uplink signal path. The method also comprises combining the at least one RF correction signal with the uplink RF signal in the uplink signal path to suppress the at least one uplink RF interference signal to a predetermined level before converting the uplink RF signal into the uplink digital communications signal.

In another aspect, a WDS is provided. The WDS comprises a plurality of remote units. The plurality of remote units is configured to receive and convert a plurality of downlink digital communications signals into a plurality of downlink RF communications signals for distribution to client devices. The plurality of remote units is also configured to receive a plurality of uplink RF communications signals from the client devices and convert the plurality of uplink RF communications signals into a plurality of uplink digital communications signals. The WDS also comprises a central unit. The central unit is configured to distribute the plurality of downlink digital communications signals to the plurality of remote units. The central unit is also configured to receive the plurality of uplink digital communications signals from the plurality of remote units. At least one selected remote unit among the plurality of remote units comprises an uplink signal path. The uplink signal path is configured to receive an uplink RF signal among the plurality of uplink RF communications signals comprising at least one uplink RF communications signal and at least one uplink RF interference signal. The uplink signal path is also configured to convert the uplink RF signal into an uplink digital communications signal among the plurality of uplink digital communications signals for distribution to the central unit. The at least one selected remote unit also comprises a correction path communicatively coupled to the uplink signal path. The correction path is configured to receive and convert the uplink RF signal into an uplink digital signal. The at least one selected remote unit also comprises a digital signal processing circuit communicatively coupled to the uplink signal path and the correction path. The digital signal processing circuit is configured to receive the uplink digital signal from the correction path. The digital signal processing circuit is also configured to analyze the uplink digital signal to identify interference characteristics of the at least one uplink RF interference signal. The digital signal processing circuit is also configured to generate at least one digital correction signal relative to the at least one uplink RF interference signal based on the identified interference characteristics of the at least one uplink RF interference signal. The correction path is further configured to convert the at least one digital correction signal into at least one RF correction signal relative to the at least one uplink RF interference signal and provide the at least one RF correction signal to the uplink signal path. The uplink signal path is further configured to combine the at least one RF correction signal with the uplink RF signal to suppress the at least one uplink RF interference signal to a predetermined level before converting the uplink RF signal into the uplink digital communications signal.

Additional features and advantages will be set forth in the detailed description which follows and, in part, will be readily apparent to those skilled in the art from the description or recognized by practicing the embodiments as described in the written description and claims hereof, as well as the appended drawings.

It is to be understood that both the foregoing general description and the following detailed description are merely exemplary and are intended to provide an overview or framework to understand the nature and character of the claims.

The accompanying drawings are included to provide a further understanding of the disclosure, and are incorporated in and constitute a part of this specification. The drawings illustrate one or more embodiment(s), and together with the description serve to explain principles and operation of the various embodiments.

DETAILED DESCRIPTION

Embodiments of the disclosure relate to suppressing an uplink radio frequency (RF) interference signal(s) in a remote unit in a wireless distribution system (WDS) using a correction signal(s) relative to the uplink RF interference signal(s). A remote unit in a WDS includes an uplink signal path configured to receive and convert an uplink RF signal, which can include an uplink RF communications signal(s) and an uplink RF interference signal(s), into an uplink digital communications signal for distribution to a central unit in the WDS. To mitigate adverse impacts the uplink RF interference signal(s) may have on the uplink RF communications signal(s), the remote unit is configured to suppress the uplink RF interference signal(s) using an RF correction signal(s) relative to the uplink RF interference signal(s). In this regard, the remote unit further includes a correction path and a digital signal processing circuit. The correction path receives and converts the uplink RF signal(s) into an uplink digital signal(s). The digital signal processing circuit analyzes the uplink digital signal(s) to identify interference characteristics (e.g., phase and amplitude) of the uplink RF interference signal(s) and generates a digital correction signal(s) based on the identified interference characteristics. The correction path is further configured to convert the digital correction signal(s) into the RF correction signal(s). The uplink signal path combines the RF correction signal(s) with the uplink RF signal to suppress the uplink RF interference signal(s) to a predetermined level before converting the uplink RF signal(s) into the uplink digital communications signal(s). By suppressing the uplink RF interference signal(s) using the RF correction signal(s) relative to the uplink RF interference signal(s), it is possible to mitigate the adverse impacts of the uplink RF interference signal(s) in the uplink signal path, thus preserving integrity and quality of the uplink RF communications signal(s).

Figure 1:
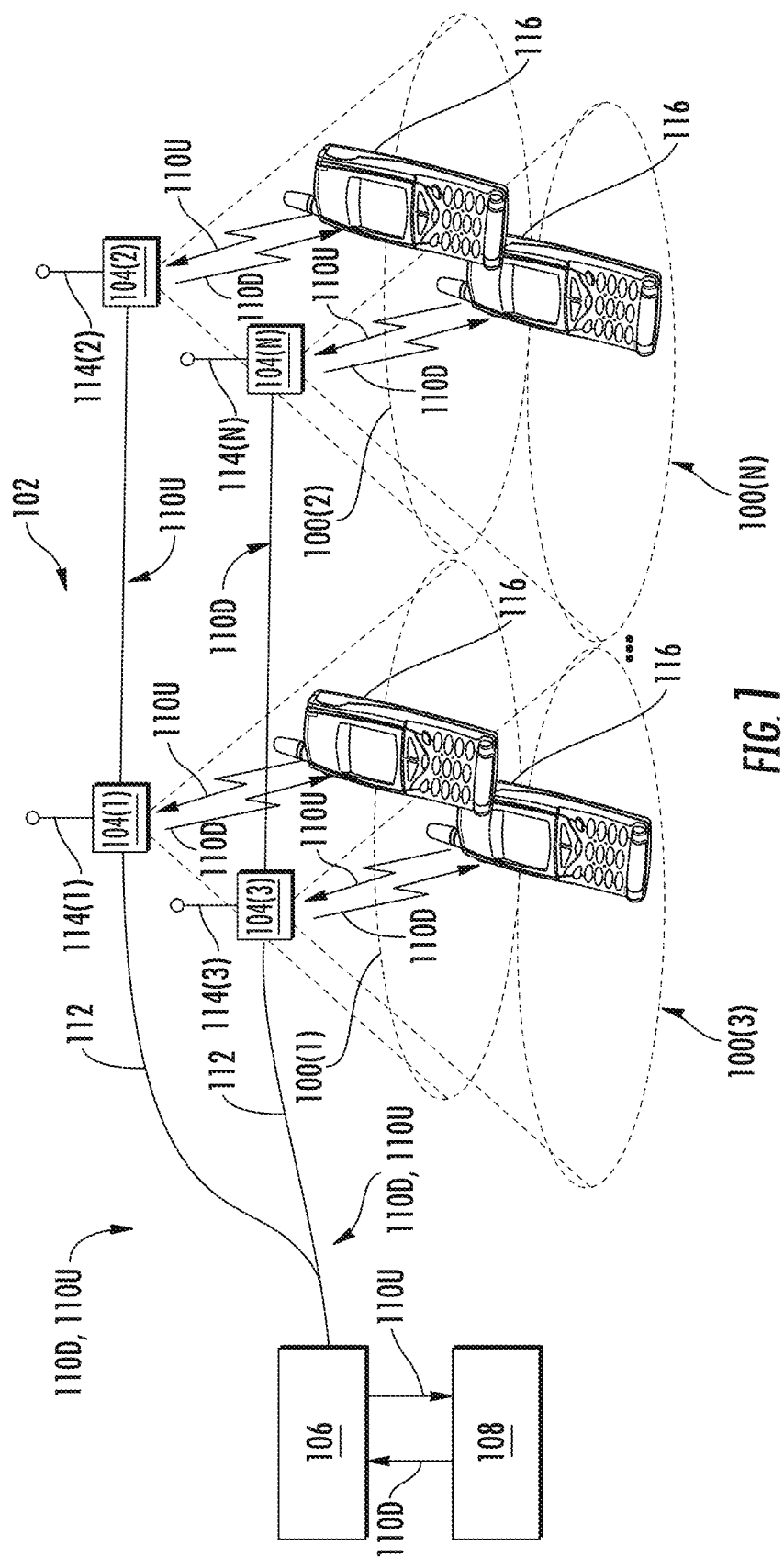
FIG. 1 is a schematic diagram of an exemplary wireless distribution system (WDS), which may be a distributed antenna system (DAS) for example.
Figure 2:
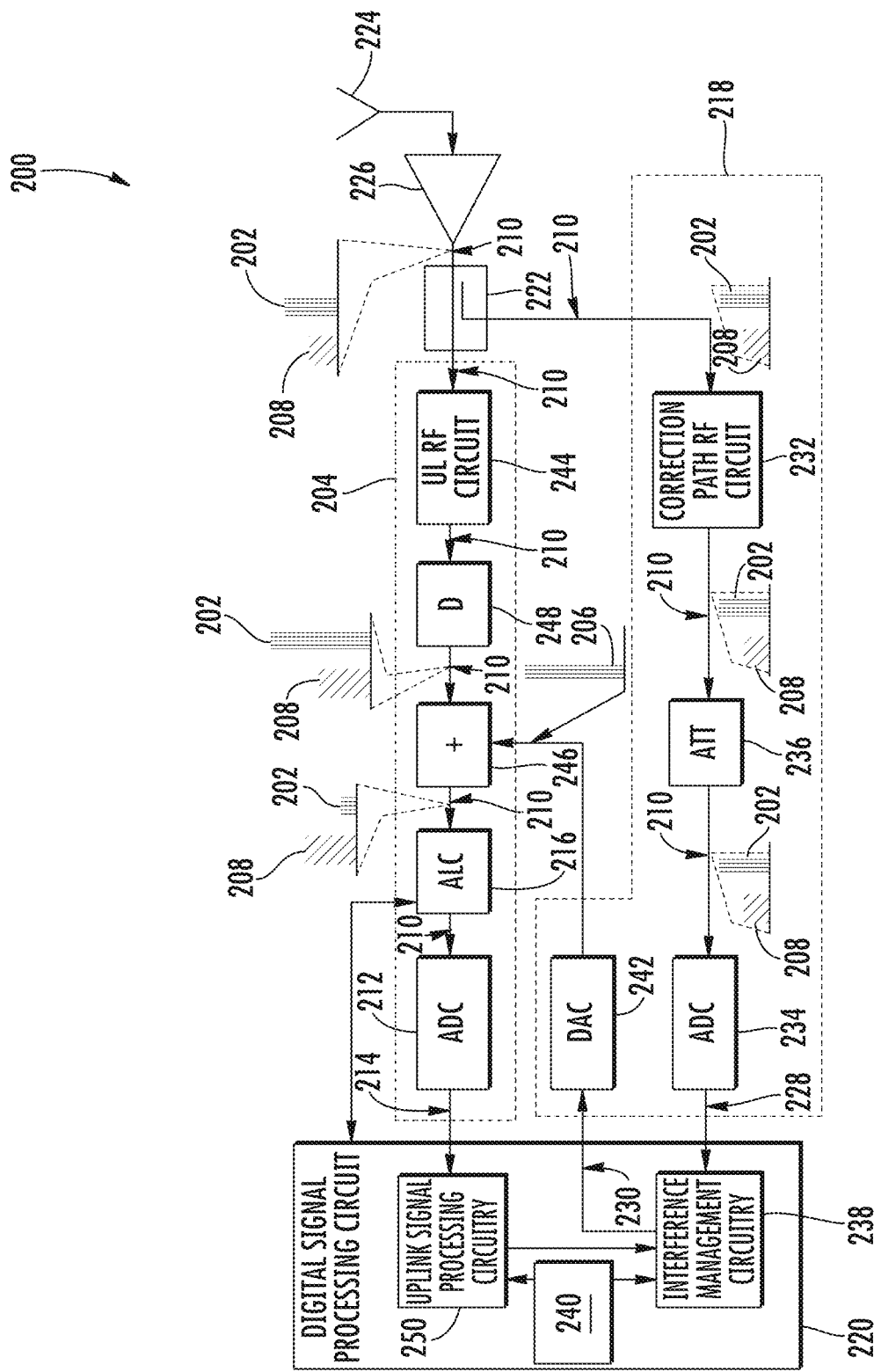
FIG. 2 is a schematic diagram of an exemplary remote unit configured to suppress at least one uplink radio frequency (RF) interference signal to a predetermined level in an uplink signal path using at least one RF correction signal relative to the uplink RF interference signal in an operation mode.

In this regard, FIG. 2 is a schematic diagram of an exemplary remote unit 200 configured to suppress at least one uplink RF interference signal 202 to a predetermined level in an uplink signal path 204 using at least one RF correction signal 206 relative to the uplink RF interference signal 202 in an operation mode. The remote unit 200, which can be provided in a WDS, is configured to receive at least one uplink RF communications signal 208 from client devices in a coverage area of the remote unit 200. In a non-limiting example, the remote unit 200 can be a software-defined remote unit and/or a multi-service remote unit capable of supporting a variety of wireless communications services in a wide RF spectrum (e.g., 700-2700 MHz RF spectrum). As such, the remote unit 200 can receive the uplink RF communications signal 208 along with the uplink RF interference signal 202 in an uplink RF signal 210 via the uplink signal path 204.

The uplink signal path 204 includes a signal path analog-to-digital converter (ADC) 212 configured to convert the uplink RF signal 210 into an uplink digital communications signal 214 for distribution to a central unit in the WDS. In absence of the uplink RF interference signal 202, the uplink RF signal 210 would include only the uplink RF communications signal 208. As a result, the signal path ADC 212 will convert the uplink RF communications signal 208 into the uplink digital communications signal 214. However, the presence of the uplink RF interference signal 202 in the uplink RF signal 210 can overdrive the signal path ADC 212. For example, the uplink RF interference signal 202 can be received at a higher power level (e.g., voltage level), which may result in a voltage level exceeding the maximum allowed voltage level at the signal path ADC 212. As a result, the signal path ADC 212 can generate noise and/or distortion when converting the uplink RF signal 210 into the uplink digital communications signal 214. It may be possible to employ a signal path automatic level control (ALC) 216 in the uplink signal path 204 to attenuate the uplink RF signal 210, and thus reduce the higher power level of the uplink RF interference signal 202. However, by attenuating the uplink RF signal 210, the signal path ALC 216 will also weaken the uplink RF communications signal 208, thus potentially leading to a reduced signal-to-noise ratio (SNR) for the uplink RF communications signal 208. Hence, it may be desired to suppress the uplink RF interference signal 202 in the uplink RF signal 210 before the uplink RF signal 210 reaches the signal path ADC 212 without compromising the uplink RF communications signal 208 in the uplink RF signal 210.

As is further discussed below, the remote unit 200 is configured to analyze interference characteristics (e.g., frequency, amplitude, phase, and other signal characteristics) of the uplink RF interference signal 202. Accordingly, the remote unit 200 can generate the RF correction signal 206 based on the determined interference characteristics of the uplink RF interference signal 202. In a non-limiting example, the RF correction signal 206 is generated with an amplitude substantially identical to the identified amplitude of the uplink RF interference signal 202. In addition, the RF correction signal 206 is also generated with a phase substantially opposite of the identified phase of the uplink RF interference signal 202. By combining the RF correction signal 206 with the uplink RF signal 210 in the uplink signal path 204 before the uplink RF signal 210 reaches the signal path ADC 212, it is possible to suppress the uplink RF interference signal 202 to the predetermined level that can be tolerated by the signal path ADC 212, thus helping to mitigate the adverse impacts (e.g., noise and distortion) of the uplink RF interference signal 202 to preserve integrity and quality of the uplink RF communications signal 208.

With continuing reference to FIG. 2, the remote unit 200 includes a correction path 218 and a digital signal processing circuit 220. The correction path 218 is communicatively coupled to the uplink signal path 204 by a coupling circuit 222, which is further coupled to an antenna 224 via an uplink signal amplifier 226. As such, the uplink signal path 204 and the correction path 218 both receive the uplink RF signal 210 that includes the uplink RF communications signal 208 and the uplink RF interference signal 202.

The correction path 218 receives and converts the uplink RF signal 210 into an uplink digital signal 228, which includes a digital version of the uplink RF interference signal 202. The digital signal processing circuit 220, which is communicatively coupled to the uplink signal path 204 and the correction path 218, receives the uplink digital signal 228 from the correction path 218. The digital signal processing circuit 220 is configured to analyze the uplink digital signal 228 to identify the interference characteristics (e.g., frequency, amplitude, phase, and other signal characteristics) of the uplink RF interference signal 202. More specifically, the digital signal processing circuit 220 analyzes the digital version of the uplink RF interference signal 202 to identify the interference characteristics of the uplink RF interference signal 202. The digital signal processing circuit 220 then generates at least one digital correction signal 230 relative to the uplink RF interference signal 202 based on the identified interference characteristics of the uplink RF interference signal 202. The correction path 218 is further configured to convert the digital correction signal 230 into the RF correction signal 206 and provide the RF correction signal 206 to the uplink signal path 204. The uplink signal path 204 is configured to combine the RF correction signal 206 with the uplink RF signal 210 to suppress the uplink RF interference signal 202 to the predetermined level before converting the uplink RF signal 210 into the uplink digital communications signal 214.

The remote unit 200 can be configured to suppress the uplink RF interference signal 202 to the predetermined level using the RF correction signal 206 according to a process. In this regard, FIG. 3 is a flowchart of an exemplary process 300 that the remote unit 200 of FIG. 2 can employ to suppress the uplink RF interference signal 202 to the predetermined level using the RF correction signal 206 relative to the uplink RF interference signal 202.

Figure 3:
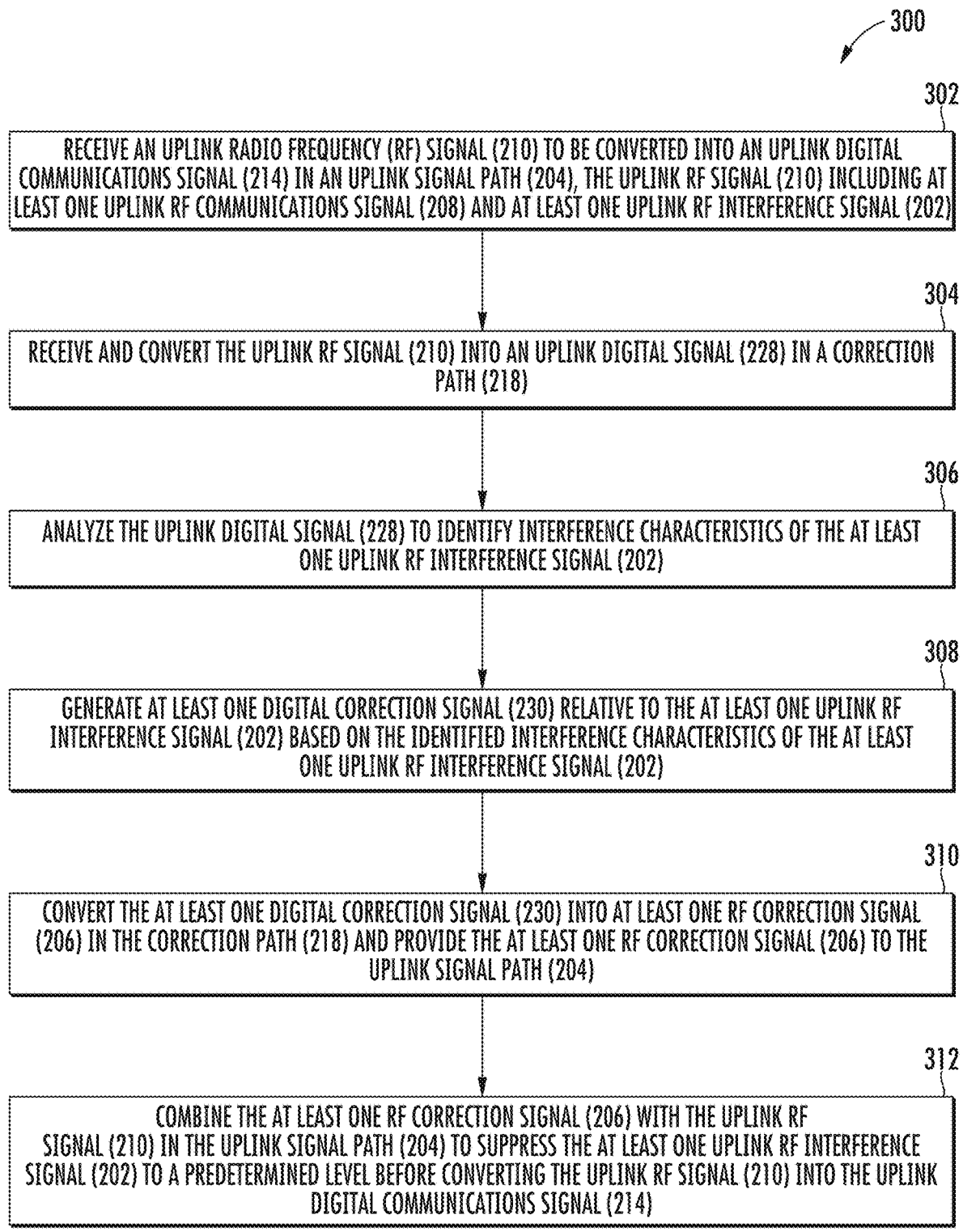
FIG. 3 is a flowchart of an exemplary process that the remote unit of FIG. 2 can employ to suppress the at least one uplink RF interference signal to the predetermined level using the at least one RF correction signal relative to the uplink RF interference signal.

With reference to FIG. 3, the remote unit 200 receives the uplink RF signal 210 to be converted into the uplink digital communications signal 214 in the uplink signal path 204. The uplink RF signal 210 includes the uplink RF communications signal 208 and the uplink RF interference signal 202 (block 302). The correction path 218 receives and converts the uplink RF signal 210 into the uplink digital signal 228 (block 304). The digital signal processing circuit 220 analyzes the uplink digital signal 228 to identify the interference characteristics of the uplink RF interference signal 202 (block 306). The digital signal processing circuit 220 generates the digital correction signal 230 relative to the uplink RF interference signal 202 based on the identified interference characteristics of the uplink RF interference signal 202 (block 308). The correction path 218 converts the digital correction signal 230 into the RF correction signal 206 and provides the RF correction signal 206 to the uplink signal path 204 (block 310). The uplink signal path 204 combines the RF correction signal 206 with the uplink RF signal 210 to suppress the uplink RF interference signal 202 to the predetermined level before converting the uplink RF signal 210 into the uplink digital communications signal 214 (block 312).

With reference back to FIG. 2, the correction path 218 includes a correction path RF circuit 232, which is configured to amplify and/or filter the uplink RF signal 210. The correction path 218 also includes a correction path ADC 234 configured to receive and convert the uplink RF signal 210 into the uplink digital signal 228. To prevent the uplink RF interference signal 202 from overdriving the correction path ADC 234, the correction path 218 can include an attenuator 236 (shown as "ATT" in FIG. 2). The attenuator 236 is configured to receive the uplink RF signal 210 from the correction path RF circuit 232 and reduce a peak voltage of the uplink RF signal 210 below a voltage limit of the correction path ADC 234. The attenuator 236 then provides the uplink RF signal 210 having the reduced peak voltage to the correction path ADC 234.

The digital signal processing circuit 220 includes interference management circuitry 238 configured to receive the uplink digital signal 228 from the correction path ADC 234 in the correction path 218. The interference management circuitry 238 performs spectrum analysis on the uplink digital signal 228 to identify an interference frequency, interference amplitude, an interference phase, and other interference signal characteristics of the uplink RF interference signal 202. In a non-limiting example, the interference management circuitry 238 performs spectrum analysis on a digital version of the uplink digital signal 228 to identify an interference frequency, interference amplitude, an interference phase, and other interference signal characteristics of the uplink RF interference signal 202. The interference management circuitry 238 then generates the digital correction signal 230 having a spectral content substantially identical to the interference spectral content. In this regard, the digital correction signal 230 has a correction frequency substantially identical to the interference frequency, a correction amplitude substantially identical to the interference amplitude, and a correction phase substantially opposite of the interference phase of the uplink RF interference signal 202. The interference management circuitry 238 may receive and utilize information related to the uplink RF communications signal 208 to help distinguish between the uplink RF communications signal 208 and the uplink RF interference signal 202. In a non-limiting example, the interference management circuitry 238 can retrieve the information related to the uplink RF communications signal 208 from a database in a storage media 240, which can be a memory for example.

The correction path 218 further includes a correction path digital-to-analog converter (DAC) 242. The correction path DAC 242 receives the digital correction signal 230 from the interference management circuitry 238 and converts the digital correction signal 230 into the RF correction signal 206. In one exemplary aspect, the RF correction signal 206 reflects the correction amplitude and the correction phase provided by the digital correction signal 230. The RF correction signal 206 may be provided at the correction frequency by the correction path DAC 242. In another exemplary aspect, frequency conversion circuitry may be used to convert a frequency of the RF correction signal 206 to the correction frequency.

The uplink signal path 204 includes an uplink RF circuit 244 (shown as "UL RF circuit" in FIG. 2). The uplink RF circuit 244 is configured to receive the uplink RF signal 210 from the coupling circuit 222 and further amplify and/or filter the uplink RF signal 210. The uplink RF circuit 244 may also include the frequency conversion circuitry. The uplink signal path 204 includes a signal combiner 246 configured to receive the RF correction signal 206 from the correction path 218. The signal combiner 246 is configured to combine the RF correction signal 206 with the uplink RF signal 210 to suppress the uplink RF interference signal 202 to the predetermined level.

Notably, the correction path 218 can incur processing delay in receiving the uplink RF signal 210 and converting the uplink RF signal 210 into the uplink digital signal 228. Likewise, the interference management circuitry 238 may also incur delay in analyzing the uplink digital signal 228 and generating the digital correction signal 230. In addition, the correction path 218 may incur further delay when converting the digital correction signal 230 into the RF correction signal 206. As a result of the cumulative delay incurred by the correction path 218 and the interference management circuitry 238, the signal combiner 246 may receive the uplink RF signal 210 sooner than the RF correction signal 206.

Consequently, the correction phase of the RF correction signal 206 may be misaligned with the interference phase of the uplink RF interference signal 202 when the signal combiner 246 combines RF correction signal 206 with the uplink RF signal 210. Such phase misalignment may compromise the intended result of interference signal suppression.

To help mitigate timing discrepancy between the RF correction signal 206 and the uplink RF interference signal 202 at the signal combiner 246, the uplink signal path 204 includes a delay circuit 248 (shown as "D" in FIG. 2). The delay circuit 248 receives the uplink RF signal 210 from the uplink RF circuit 244. The delay circuit 248 is configured to provide the uplink RF signal 210 to the signal combiner 246 after a delay period. The delay period is determined to cause the signal combiner 246 to receive the uplink RF signal 210 after receiving the RF correction signal 206, thus helping to improve alignment between the correction phase of the RF correction signal 206 and the interference phase of the uplink RF interference signal 202. The delay circuit 248 may be pre-set to an initial delay period, which can be obtained based on simulation or estimates for example. The initial delay period is pre-set to be large enough to enable the RF correction signal 206, which is generated by the interference management circuitry 238, to arrive at the signal combiner 246 at the same time (phase) as the uplink RF signal 210, which includes uplink RF interference signal 202. As discussed below, the interference management circuitry 238 may digitally adjust (e.g., increase or decrease) delay of the digital correction signal 230 dynamically, and thus adjusting delay of the RF correction signal 206, until the uplink RF interference signal 202 is suppressed to the predetermined level.

With continuing reference to FIG. 2, the digital signal processing circuit 220 includes uplink signal processing circuitry 250. The uplink signal processing circuitry 250 receives the uplink digital communications signal 214 from the signal path ADC 212. The uplink signal processing circuitry 250 provides a sample of the uplink digital communications signal 214, which includes the uplink RF communications signal 208 and the uplink RF interference signal 202, to the interference management circuitry 238.

The interference management circuitry 238 measures a power level corresponding to the uplink RF interference signal 202 in the uplink digital communications signal 214. The interference management circuitry 238 is configured to determine whether the measured power level of the uplink RF interference signal 202 is greater than the predetermined level, and adjusts correction parameters, such as the correction frequency, the correction amplitude, the correction phase, and the delay of the digital correction signal 230, in response to the measured power level being greater than the predetermined level. Specifically, the interference management circuitry 238 may adjust the correction frequency, the correction amplitude, and/or the correction phase of the digital correction signal 230. The interference management circuitry 238 may further digitally adjust the delay of the digital correction signal 230 to ensure the uplink RF interference signal 202 is suppressed to the predetermined level. In addition, the signal path ALC 216 may be configured to attenuate the uplink RF signal 210 in response to the measured power level of the uplink RF interference signal 202 exceeding a predefined power threshold of the signal path ALC 216. By continuously monitoring the measured power level of the uplink RF interference signal 202 and dynamically adjusting the correction frequency, the correction amplitude, the correction phase, and/or the delay of the RF correction signal 206, it may be possible to suppress the uplink RF interference signal 202 to the predetermined level in the remote unit 200.

Figure 4:
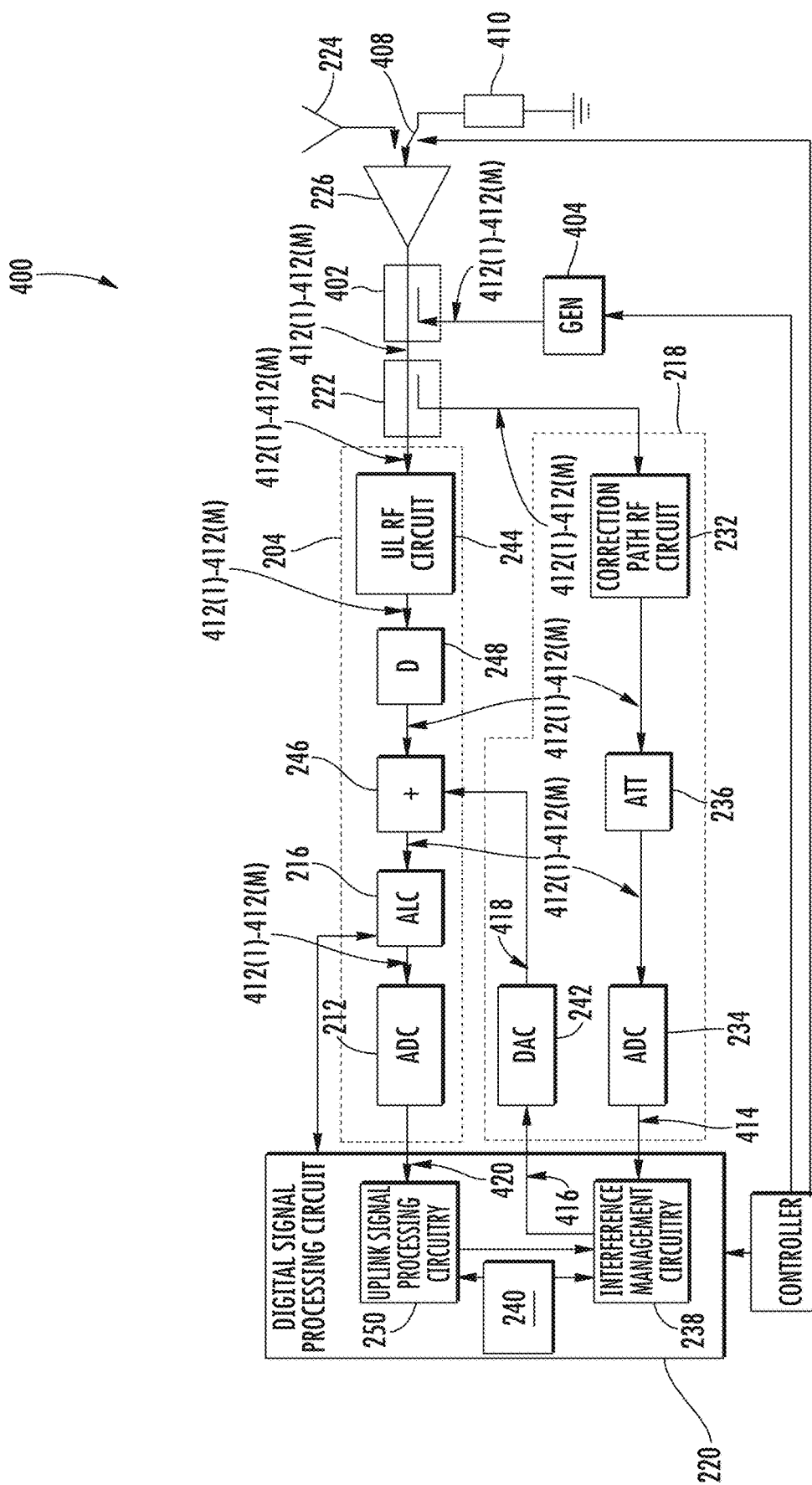
FIG. 4 is a schematic diagram of an exemplary remote unit configured to predetermine correction parameters in a test mode and store the predetermined correction parameters for dynamically configuring the remote unit to suppress the at least one uplink RF interference signal of FIG. 2.

Alternative to monitoring the measured power level of the uplink RF interference signal 202 and dynamically adjusting the correction parameters (e.g., the correction frequency, the correction amplitude, the correction phase, and/or the delay of the RF correction signal 206), it may be possible to predetermine correction parameters in a test mode and store the determined correction parameters in the storage media 240 for later use. In this regard, FIG. 4 is a schematic diagram of an exemplary remote unit 400 configured to predetermine correction parameters in a test mode, and store the predetermined correction parameters for dynamically configuring the remote unit 400 to suppress the uplink RF interference signal 202 of FIG. 2. Common elements between FIGS. 2 and 4 are shown therein with common element numbers and will not be re-described herein.

With reference to FIG. 4, the remote unit 400 includes a second coupling circuit 402, a signal generator 404, and a controller 406. In a non-limiting example, the signal generator 404 (shown as "Gen" in FIG. 4) and the controller 406 are provided in test equipment outside the remote unit 400. The second coupling circuit 402 is coupled to the coupling circuit 222 and the antenna 224, and the signal generator 404 is coupled to the second coupling circuit 402. The controller 406 is coupled to the digital signal processing circuit 220 and the signal generator 404.

The controller 406 configures the remote unit 400 to operate in the test mode by decoupling the second coupling circuit 402 from the antenna 224. In a non-limiting example, the controller 406 decouples the second coupling circuit 402 from the antenna 224 by toggling a switch 408 from the antenna 224 to a load resistor 410 (e.g., 50 Ohms). The switch 408 and the load resistor 410 may be disposed between the uplink signal amplifier 226 and the second coupling circuit 402. By decoupling the second coupling circuit 402 from the antenna 224, the remote unit 400 will not receive the uplink RF signal 210 as the remote unit 200 does in FIG. 2. Instead, the controller 406 controls the signal generator 404 to generate a plurality of interference test signals 412(1)-412(M). Each of the interference test signals 412(1)-412(M) corresponds to a test signal center frequency and a test signal power level. In a non-limiting example, the test signal center frequency and the test signal power level corresponding to each of the interference test signals 412(1)-412(M) can be determined based on simulation, estimation, and/or other applicable means. The controller 406 further configures the signal generator 404 to provide the interference test signals 412(2)-412(M) to the second coupling circuit 402.

For the convenience of illustration and reference, the interference test signal 412(1) is discussed hereinafter as a non-limiting example. It shall be appreciated that the process for predetermining the correction parameters discussed herein with reference to the interference test signal 412(1) is repeated for each of the interference test signals 412(1)-412(M).

With continuing reference to FIG. 4, the coupling circuit 222 receives the interference test signal 412(1) from the second coupling circuit 402 and provides the interference test signal 412(1) to the uplink signal path 204 and the correction path 218. The correction path ADC 234 is configured to convert the interference test signal 412(1) into a digital interference test signal 414. The interference management circuitry 238 is configured to receive the digital interference test signal 414 from the correction path ADC 234. The interference management circuitry 238 performs spectrum analysis on the digital interference test signal 414 to identify a test mode interference frequency, a test mode interference amplitude, a test mode interference phase, and other test mode interference signal characteristics of the interference test signal 412(1). The interference management circuitry 238 further generates a digital correction test signal 416 having a test mode correction frequency substantially identical to the test mode interference frequency, a test mode correction amplitude substantially identical to the test mode interference amplitude, and a test mode correction phase substantially opposite of the test mode interference phase. The correction path DAC 242 converts the digital correction test signal 416 into an analog correction test signal 418 and provides the analog correction test signal 418 to the signal combiner 246. In this regard, the analog correction test signal 418 reflects the test mode correction frequency, the test mode correction amplitude, and the test mode correction phase provided by the digital correction test signal 416. In one exemplary aspect, the analog correction test signal 418 may be provided at the test mode correction frequency by the correction path DAC 242. In another exemplary aspect, frequency conversion circuitry can be used to convert a frequency of the analog correction test signal 418 to the test mode correction frequency. The signal combiner 246 combines the analog correction test signal 418 with the interference test signal 412(1). The signal path ADC 212 converts the interference test signal 412(1), after being combined with the analog correction test signal 418, into a second digital interference test signal 420. The uplink signal processing circuitry 250 receives the second digital interference test signal 420 from the signal path ADC 212 and provides a sample of the second digital interference test signal 420 to the interference management circuitry 238.

The interference management circuitry 238 measures an interference power level corresponding to the interference test signal 412(1) in the second digital interference test signal 420. The interference management circuitry 238 is configured to determine whether the measured interference power level corresponding to the interference test signal 412(1) in the second digital interference test signal 420 is greater than the predetermined level, and adjusts the correction parameters, such as the test mode correction frequency, the test mode correction amplitude, the test mode correction phase, and delay of the digital correction test signal 416, in response to the measured interference power level being greater than the predetermined level. Specifically, the interference management circuitry 238 may adjust the test mode correction frequency, the test mode correction amplitude, and/or the test mode correction phase of the digital correction test signal 416. The delay circuit 248 may be pre-set to an initial delay period, which can be obtained based on simulation or estimates for example. The interference management circuitry 238 may further digitally adjust (e.g., increase or decrease) the delay of the digital correction test signal 416, which is generated by the interference management circuitry 238, until the interference test signal 412(1) is suppressed to the predetermined level. The interference management circuitry 238 may record the correction parameters corresponding to the interference test signal 412(1) in the storage media 240. More specifically, the interference management circuitry 238 records the test mode correction frequency, the test mode correction amplitude, the test mode correction phase, and the delay of the digital correction test signal 416 in association with the test mode interference amplitude and the test mode interference phase in the storage media 240. Thus, by pre-storing the correction parameters corresponding to each of the interference test signals 412(1)-412(M) in the storage media 240, the interference management circuitry 238 of FIG. 2 can retrieve an appropriate correction parameter (e.g., the correction frequency, the correction phase, the correction amplitude, and the delay of the RF correction signal 206) based on the interference characteristics of the uplink RF interference signal 202, thus improving responsiveness in suppressing the uplink RF interference signal 202 when the remote unit 400 in the test mode is switched to the remote unit 200 of FIG. 2 in the operation mode.

Figure 5:
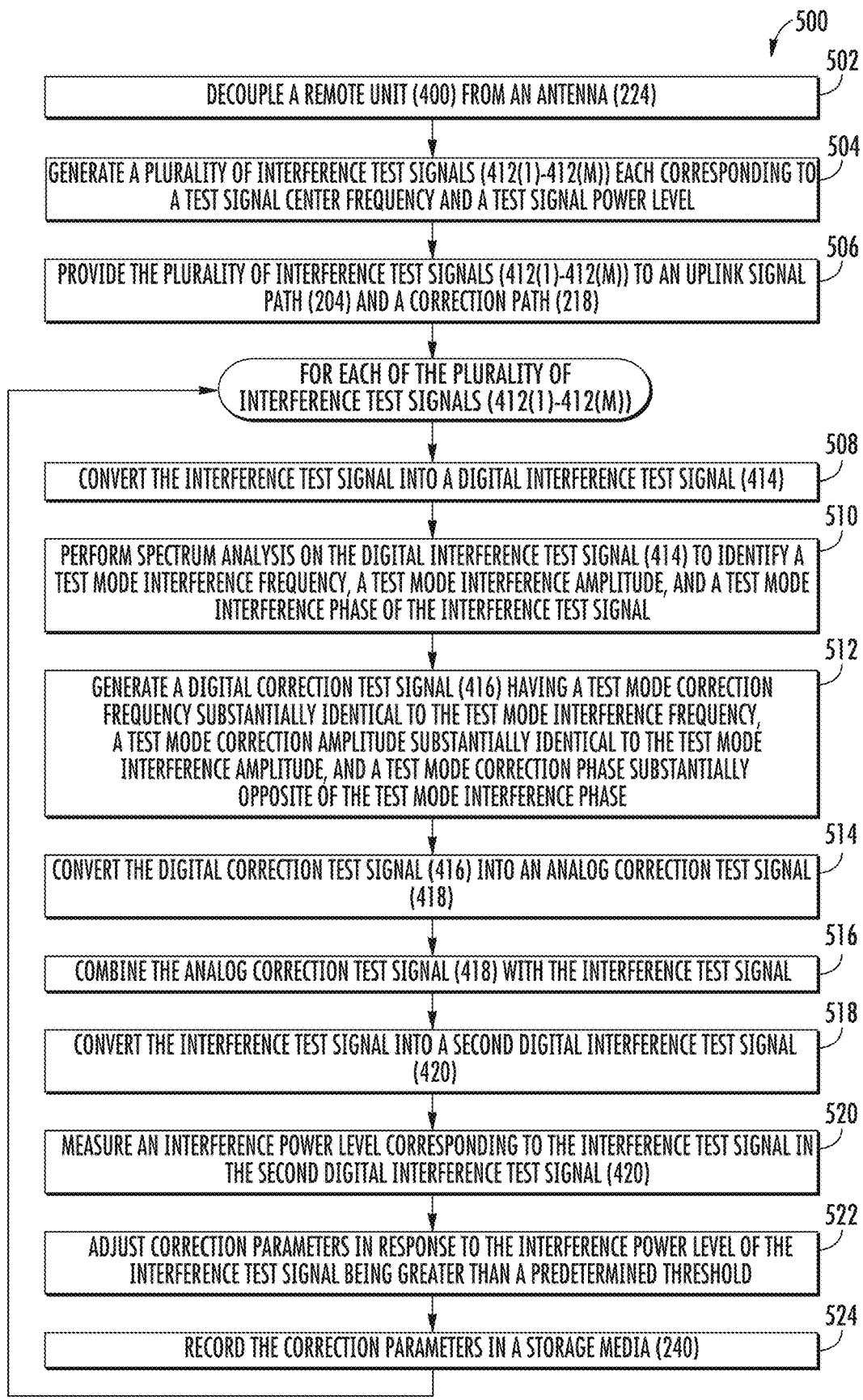
FIG. 5 is a flowchart of an exemplary process that the remote unit of FIG. 4 can employ to predetermine the correction parameters in the test mode.

FIG. 5 is a flowchart of an exemplary process 500 that the remote unit 400 of FIG. 4 can employ to predetermine the correction parameters in the test mode. With reference to FIG. 5, the controller 406 decouples the remote unit 400 from the antenna 224 to place the remote unit 400 in the test mode (block 502). The signal generator 404 generates the interference test signals 412(1)-412(M) each corresponding to the test signal center frequency and the test signal power level (block 504). The signal generator 404 then provides the interference test signals 412(1)-412(M) to the uplink signal path 204 and the correction path 218 (block 506).

The following steps are repeated for each of the interference test signals 412(1)-412(M). The interference test signal 412(1) is again referenced herein as a non-limiting example. The correction path ADC 234 converts the interference test signal 412(1) into the digital interference test signal 414 (block 508). The interference management circuitry 238 performs spectrum analysis on the digital interference test signal 414 to identify the test mode interference frequency, the test mode interference amplitude, and the test mode interference phase of the interference test signal 412(1) (block 510). The interference management circuitry 238 generates the digital correction test signal 416 having the test mode correction frequency substantially identical to the test mode interference frequency, the test mode correction amplitude substantially identical to the test mode interference amplitude and the test mode correction phase substantially opposite of the test mode interference phase (block 512). The correction path DAC 242 converts the digital correction test signal 416 into the analog correction test signal 418 (block 514). The signal combiner 246 combines the analog correction test signal 418 with the interference test signal 412(1) (block 516). The signal path ADC 212 converts the interference test signal 412(1) into the second digital interference test signal 420 (block 518). The uplink signal processing circuitry 250 provides a sample of the second digital interference test signal 420 to the interference management circuitry 238. The interference management circuitry 238 measures the interference power level corresponding to the interference test signal 412(1) in the second digital interference test signal 420 (block 520). The interference management circuitry 238 adjusts the correction parameters in response to the interference power level being greater than the predetermined threshold (block 522). The interference management circuitry 238 then records the correction parameters in the storage media 240 (block 524).

Figure 6:
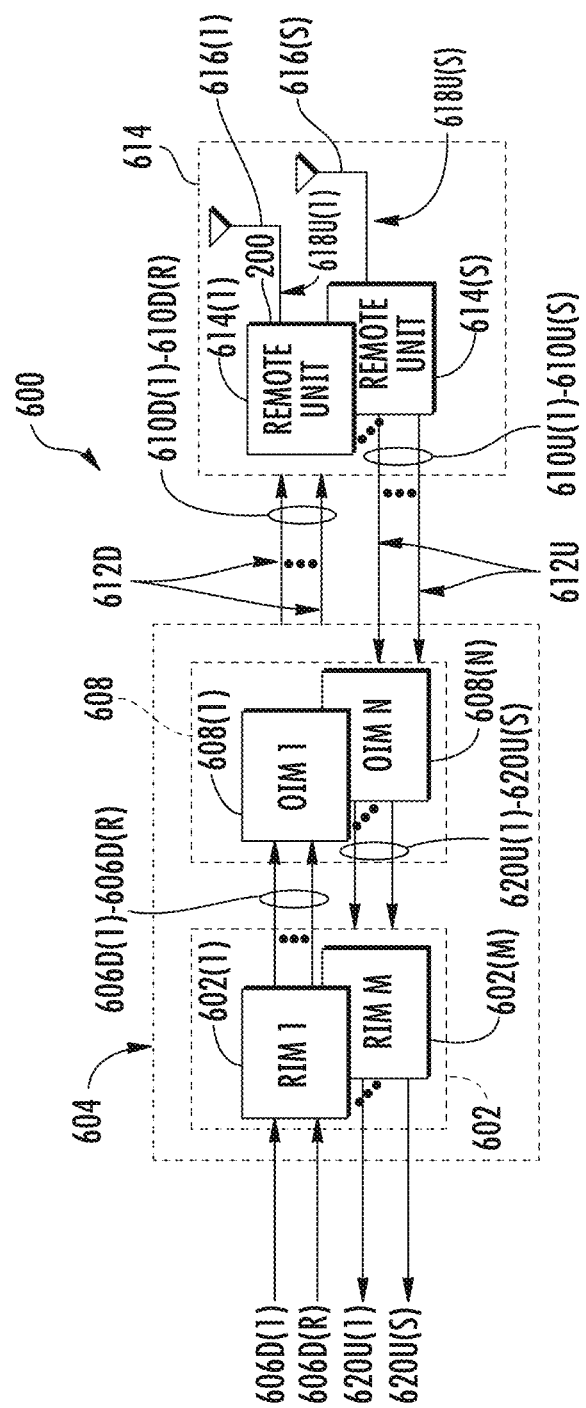
FIG. 6 is a schematic diagram an exemplary WDS provided in the form of an optical fiber-based WDS that can include a plurality of remote units, including the remote unit of FIG. 2, configured to suppress the at least one uplink RF interference signal to the predetermined level in the uplink signal path using the at least one RF correction signal relative to the uplink RF interference signal.

FIG. 6 is a schematic diagram an exemplary WDS 600 provided in the form of an optical fiber-based WDS that can include a plurality of remote units, including the remote unit 200 of FIG. 2, configured to suppress the uplink RF interference signal 202 to the predetermined level in the uplink signal path 204 using the RF correction signal 206 relative to the uplink RF interference signal 202. The WDS 600 includes an optical fiber for distributing communications services for multiple frequency bands. The WDS 600 in this example is comprised of three (3) main components in this example. A plurality of radio interfaces provided in the form of radio interface modules (RIMs) 602(1)-602(M) are provided in a central unit 604 to receive and process a plurality of downlink digital communications signals 606D(1)-606D(R) prior to optical conversion into downlink optical fiber-based communications signals. The downlink digital communications signals 606D(1)-606D(R) may be received from a base station as an example. The RIMs 602(1)-602(M) provide both downlink and uplink interfaces for signal processing. The notations "1-R" and "1-M" indicate that any number of the referenced component, 1-R and 1-M, respectively, may be provided. The central unit 604 is configured to accept the RIMs 602(1)-602(M) as modular components that can easily be installed and removed or replaced in the central unit 604. In one example, the central unit 604 is configured to support up to twelve (12) RIMs 602(1)-602 (12). Each RIM 602(1)-602(M) can be designed to support a particular type of radio source or range of radio sources (i.e., frequencies) to provide flexibility in configuring the central unit 604 and the WDS 600 to support the desired radio sources.

For example, one RIM 602 may be configured to support the Personalized Communications System (PCS) radio band. Another RIM 602 may be configured to support the 800 megahertz (MHz) radio band. In this example, by inclusion of the RIMs 602(1)-602(M), the central unit 604 could be configured to support and distribute communications signals on both PCS and Long-Term Evolution (LTE) 700 radio bands, as an example. The RIMs 602(1)-602(M) may be provided in the central unit 604 that support any frequency bands desired, including but not limited to the US Cellular band, PCS band, Advanced Wireless Service (AWS) band, 700 MHz band, Global System for Mobile communications (GSM) 900, GSM 1800, and Universal Mobile Telecommunications System (UMTS). The RIMs 602(1)-602(M) may also be provided in the central unit 604 that support any wireless technologies desired, including but not limited to Code Division Multiple Access (CDMA), CDMA200, 1×RTT, Evolution-Data Only (EV-DO), UMTS, High-speed Packet Access (HSPA), GSM, General Packet Radio Services (GPRS), Enhanced Data GSM Environment (EDGE), Time Division Multiple Access (TDMA), LTE, iDEN, and Cellular Digital Packet Data (CDPD).

The RIMs 602(1)-602(M) may be provided in the central unit 604 that support any frequencies desired, including but not limited to US FCC and Industry Canada frequencies (824-849 MHz on uplink and 869-894 MHz on downlink), US FCC and Industry Canada frequencies (1850-1915 MHz on uplink and 1930-1995 MHz on downlink), US FCC and Industry Canada frequencies (1710-1755 MHz on uplink and 2110-2155 MHz on downlink), US FCC frequencies (698-716 MHz and 776-787 MHz on uplink and 728-746 MHz on downlink), EU R & TTE frequencies (880-915 MHz on uplink and 925-960 MHz on downlink), EU R & TTE frequencies (1710-1785 MHz on uplink and 1805-1880 MHz on downlink), EU R & TTE frequencies (1920-1980 MHz on uplink and 2110-2170 MHz on downlink), US FCC frequencies (806-824 MHz on uplink and 851-869 MHz on downlink), US FCC frequencies (896-901 MHz on uplink and 929-941 MHz on downlink), US FCC frequencies (793-805 MHz on uplink and 763-775 MHz on downlink), and US FCC frequencies (2495-2690 MHz on uplink and downlink).

With continuing reference to FIG. 6, the downlink digital communications signals 606D(1)-606D(R) are provided to a plurality of optical interfaces provided in the form of optical interface modules (OIMs) 608(1)-608(N) in this embodiment to convert the downlink digital communications signals 606D(1)-606D(R) into a plurality of downlink optical fiber-based communications signals 610D(1)-610D(R). The notation "1-N" indicates that any number of the referenced component 1-N may be provided. The OIMs 608(1)-608(N) may be configured to provide a plurality of optical interface components (OICs) that contain optical-to-electrical (O/E) and electrical-to-optical (E/O) converters, as will be described in more detail below. The OIMs 608(1)-608(N) support the radio bands that can be provided by the RIMs 602(1)-602(M), including the examples previously described above.

The OIMs 608(1)-608(N) each include E/O converters to convert the downlink digital communications signals 606D (1)-606D(R) into the downlink optical fiber-based communications signals 610D(1)-610D(R). The downlink optical fiber-based communications signals 610D(1)-610D(R) are communicated over a downlink optical fiber-based communications medium 612D to a plurality of remote units 614(1)-614(S). At least one selected remote unit among the remote units 614(1)-614(S), for example the remote unit 614(1), is provided as the remote unit 200 of FIG. 2 configured to suppress the uplink RF interference signal 202 to the predetermined level in the uplink signal path 204 using the RF correction signal 206 relative to the uplink RF interference signal 202. The notation "1-S" indicates that any number of the referenced component 1-S may be provided. Remote unit O/E converters provided in the remote units 614(1)-614(S) convert the downlink optical fiber-based communications signals 610D(1)-610D(R) back into the downlink digital communications signals 606D(1)-606D(R), which are the converted into a plurality of downlink RF communications signals and provided to antennas 616(1)-616(S) in the remote units 614(1)-614(S) to client devices in the reception range of the antennas 616(1)-616 (S).

The remote units 614(1)-614(S) receive a plurality of uplink RF communications signals from the client devices through the antennas 616(1)-616(S). In this regard, the selected remote unit 614(1) among the remote units 614(1)-614(S) receives the uplink RF communications signal 208 among the uplink RF communications signals. The remote units 614(1)-614(S) covert the uplink RF communications signals into a plurality of uplink digital communications signals 618U(1)-618U(S). In this regard, the selected remote unit 614(1) among the remote units 614(1)-614(S) generates the uplink digital communications signal 214 among the uplink digital communications signals 618U(1)-618U(S). Remote unit E/O converters are also provided in the remote units 614(1)-614(S) to convert the uplink digital communications signals 618U(1)-618U(S) into a plurality of uplink optical fiber-based communications signals 610U(1)-610U(S). The remote units 614(1)-614(S) communicate the uplink optical fiber-based communications signals 610U(1)-610U(S) over an uplink optical fiber-based communications medium 612U to the OIMs 608(1)-608(N) in the central unit 604. The OIMs 608(1)-608(N) include O/E converters that convert the received uplink optical fiber-based communications signals 610U(1)-610U(S) into uplink digital communications signals 620U(1)-620U(S), which are processed by the RIMs 602(1)-602(M) and provided as the uplink digital communications signals 620U(1)-620U(S). The central unit 604 may provide the uplink digital communications signals 620U(1)-620U(S) to a base station or other communications system.

Note that the downlink optical fiber-based communications medium 612D and the uplink optical fiber-based communications medium 612U connected to each of the remote units 614(1)-614(S) may be a common optical fiber-based communications medium, wherein for example, wave division multiplexing (WDM) is employed to provide the downlink optical fiber-based communications signals 610D(1)-610D(R) and the uplink optical fiber-based communications signals 610U(1)-610U(S) on the same optical fiber-based communications medium.

Figure 7:
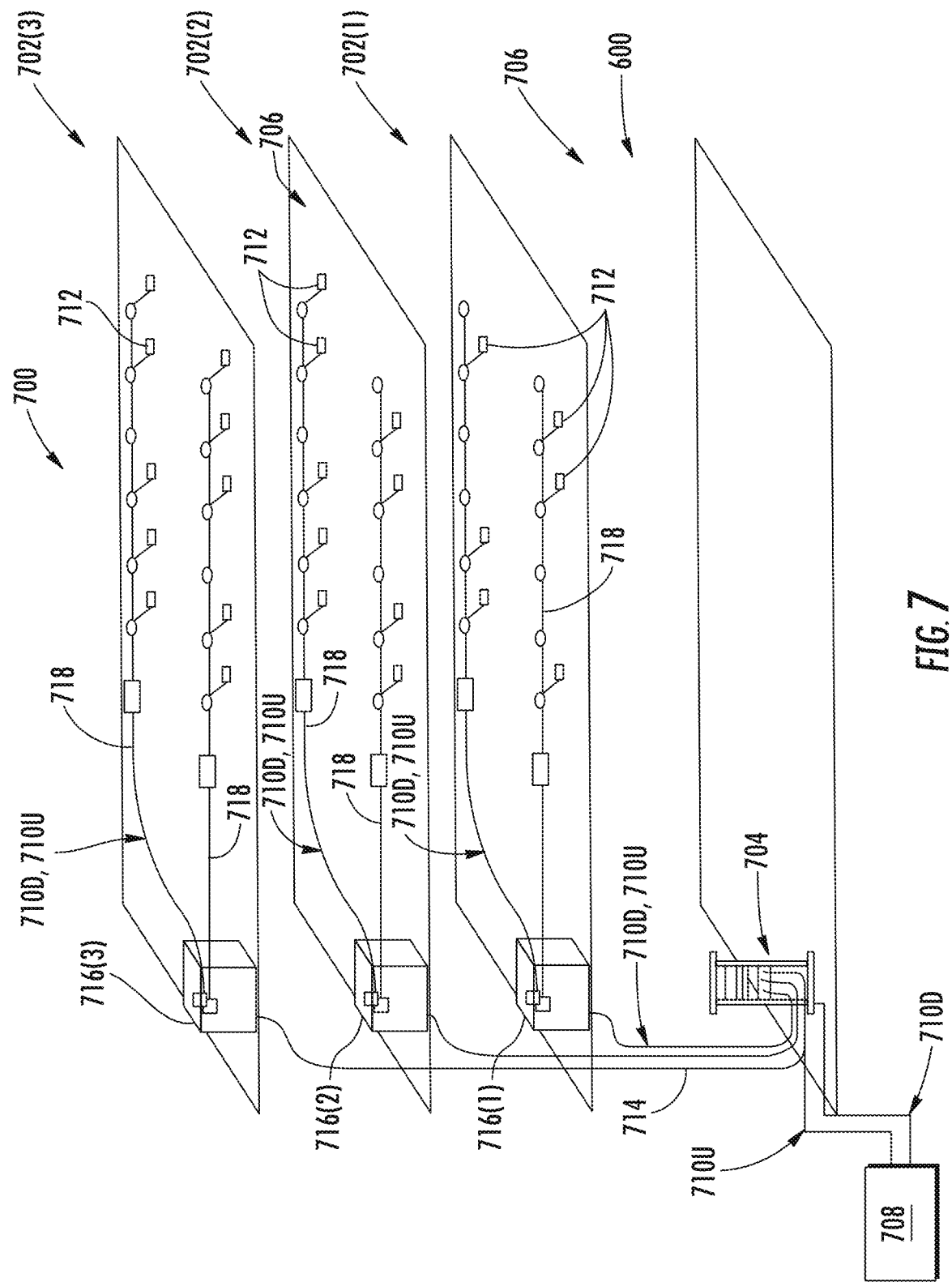
FIG. 7 is a partial schematic cut-away diagram of an exemplary building infrastructure in which a WDS, such as the WDS of FIG. 6, including the remote unit of FIG. 2, can be configured to suppress the at least one uplink RF interference signal to the predetermined level in the uplink signal path using the at least one RF correction signal relative to the at least one uplink RF interference signal.

The WDS 600 of FIG. 6 may be provided in an indoor environment, as illustrated in FIG. 7. FIG. 7 is a partial schematic cut-away diagram of an exemplary building infrastructure 700 in which a WDS, such as the WDS 600 of FIG. 6, including the remote unit 200 of FIG. 2, can be configured to suppress the uplink RF interference signal 202 to the predetermined level in the uplink signal path 204 using the RF correction signal 206 relative to the uplink RF interference signal 202. The building infrastructure 700 in this embodiment includes a first (ground) floor 702(1), a second floor 702(2), and a third floor 702(3). The floors 702(1)-702(3) are serviced by a central unit 704 to provide antenna coverage areas 706 in the building infrastructure 700. The central unit 704 is communicatively coupled to a base station 708 to receive downlink communications signals 710D from the base station 708. The central unit 704 is communicatively coupled to a plurality of remote units 712 to distribute the downlink communications signals 710D to the remote units 712 and to receive uplink communications signals 710U from the remote units 712, as previously discussed above. The downlink communications signals 710D and the uplink communications signals 710U communicated between the central unit 704 and the remote units 712 are carried over a riser cable 714. The riser cable 714 may be routed through interconnect units (ICUs) 716(1)-716(3) dedicated to each of the floors 702(1)-702(3) that route the downlink communications signals 710D and the uplink communications signals 710U to the remote units 712 and also provide power to the remote units 712 via array cables 718.

Figure 8:
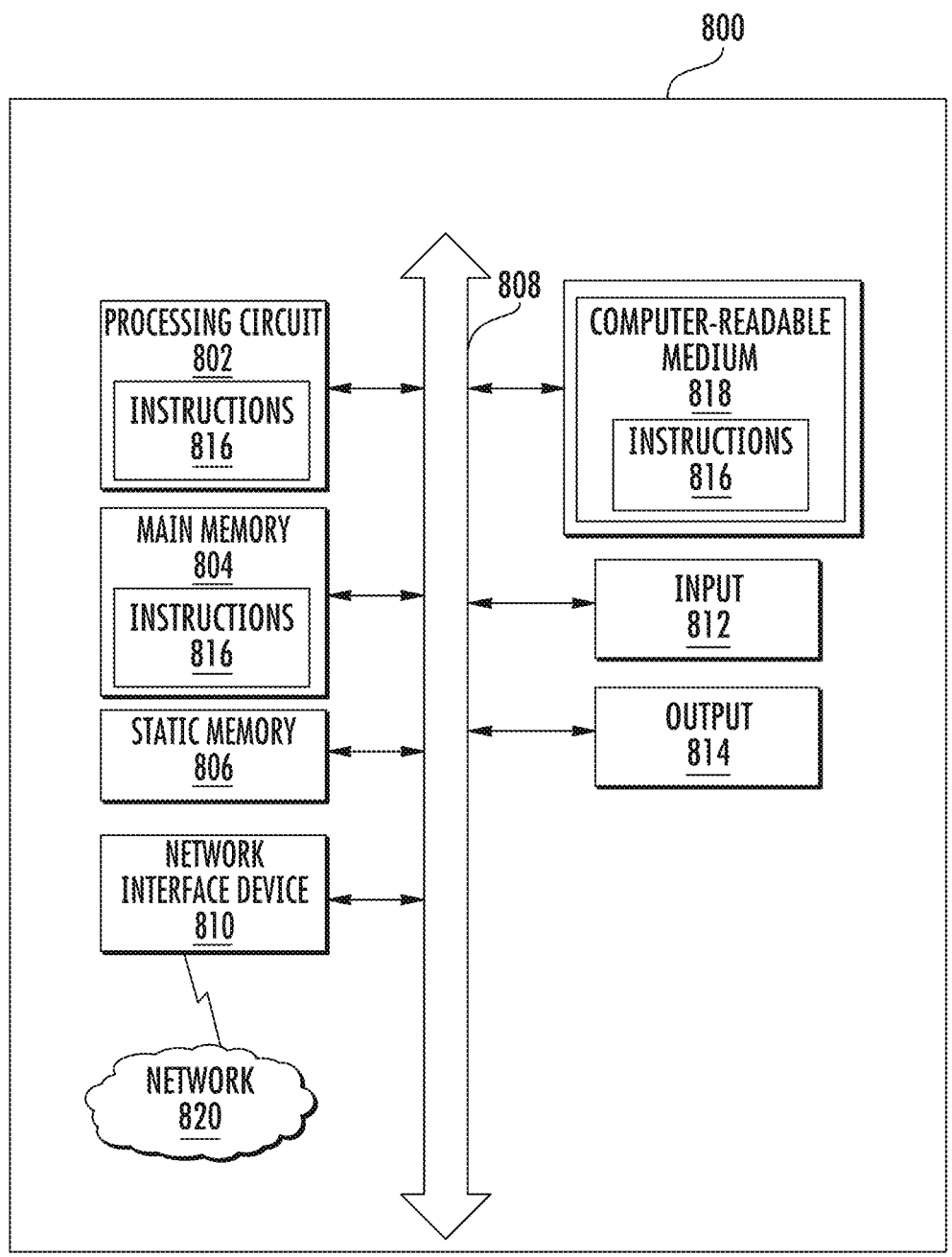
FIG. 8 is a schematic diagram representation of additional detail illustrating an exemplary computer system that could be employed in a controller, including interference management circuitry in the remote unit of FIG. 2, for generating at least one digital correction signal relative to the at least one uplink RF interference signal based on identified interference characteristics of the at least one uplink RF interference signal.

FIG. 8 is a schematic diagram representation of additional detail illustrating an exemplary computer system 800 that could be employed in a controller, including the interference management circuitry 238 in the remote unit 200 of FIG. 2, for generating the digital correction signal 230 relative to the uplink RF interference signal 202 based on identified interference characteristics of the uplink RF interference signal 202. In this regard, the computer system 800 is adapted to execute instructions from an exemplary computer-readable medium to perform these and/or any of the functions or processing described herein.

In this regard, the computer system 800 in FIG. 8 may include a set of instructions that may be executed to predict frequency interference to avoid or reduce interference in a multi-frequency DAS. The computer system 800 may be connected (e.g., networked) to other machines in a LAN, an intranet, an extranet, or the Internet. While only a single device is illustrated, the term "device" shall also be taken to include any collection of devices that individually or jointly execute a set (or multiple sets) of instructions to perform any one or more of the methodologies discussed herein. The computer system 800 may be a circuit or circuits included in an electronic board card, such as, a printed circuit board (PCB), a server, a personal computer, a desktop computer, a laptop computer, a personal digital assistant (PDA), a computing pad, a mobile device, or any other device, and may represent, for example, a server or a user's computer.

The exemplary computer system 800 in this embodiment includes a processing device or processor 802, a main memory 804 (e.g., read-only memory (ROM), flash memory, dynamic random access memory (DRAM), such as synchronous DRAM (SDRAM), etc.), and a static memory 806 (e.g., flash memory, static random access memory (SRAM), etc.), which may communicate with each other via a data bus 808. Alternatively, the processor 802 may be connected to the main memory 804 and/or the static memory 806 directly or via some other connectivity means. The processor 802 may be a controller, and the main memory 804 or the static memory 806 may be any type of memory.

The processor 802 represents one or more general-purpose processing devices, such as a microprocessor, central processing unit, or the like. More particularly, the processor 802 may be a complex instruction set computing (CISC) microprocessor, a reduced instruction set computing (RISC) microprocessor, a very long instruction word (VLIW) microprocessor, a processor implementing other instruction sets, or other processors implementing a combination of instruction sets. The processor 802 is configured to execute processing logic in instructions for performing the operations and steps discussed herein.

The computer system 800 may further include a network interface device 810. The computer system 800 also may or may not include an input 812, configured to receive input and selections to be communicated to the computer system 800 when executing instructions. The computer system 800 also may or may not include an output 814, including but not limited to a display, a video display unit (e.g., a liquid crystal display (LCD) or a cathode ray tube (CRT)), an alphanumeric input device (e.g., a keyboard), and/or a cursor control device (e.g., a mouse).

The computer system 800 may or may not include a data storage device that includes instructions 816 stored in a computer-readable medium 818. The instructions 816 may also reside, completely or at least partially, within the main memory 804 and/or within the processor 802 during execution thereof by the computer system 800, the main memory 804 and the processor 802 also constituting computer-readable medium. The instructions 816 may further be transmitted or received over a network 820 via the network interface device 810.

While the computer-readable medium 818 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding, or carrying a set of instructions for execution by the processing device and that cause the processing device to perform any one or more of the methodologies of the embodiments disclosed herein. The term "computer-readable medium" shall accordingly be taken to include, but not be limited to, solid-state memories, optical medium, and magnetic medium.

The embodiments disclosed herein include various steps. The steps of the embodiments disclosed herein may be formed by hardware components or may be embodied in machine-executable instructions, which may be used to cause a general-purpose or special-purpose processor programmed with the instructions to perform the steps. Alternatively, the steps may be performed by a combination of hardware and software.

The embodiments disclosed herein may be provided as a computer program product, or software, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes: a machine-readable storage medium (e.g., ROM, random access memory ("RAM"), a magnetic disk storage medium, an optical storage medium, flash memory devices, etc.); and the like.

Unless otherwise expressly stated, it is in no way intended that any method set forth herein be construed as requiring that its steps be performed in a specific order. Accordingly, where a method claim does not actually recite an order to be followed by its steps, or it is not otherwise specifically stated in the claims or descriptions that the steps are to be limited to a specific order, it is in no way intended that any particular order be inferred.

It will be apparent to those skilled in the art that various modifications and variations can be made without departing from the spirit or scope of the invention. Since modifications, combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A remote unit in a wireless distribution system (WDS), comprising:
an uplink signal path configured to:
receive an uplink radio frequency (RF) signal comprising at least one uplink RF communications signal and at least one uplink RF interference signal; and
convert the uplink RF signal into an uplink digital communications signal for distribution to a central unit in the WDS;
a correction path communicatively coupled to the uplink signal path, the correction path configured to receive and convert the uplink RF signal into an uplink digital signal; and
a digital signal processing circuit communicatively coupled to the uplink signal path and the correction path, the digital signal processing circuit configured to:
receive the uplink digital signal from the correction path;
analyze the uplink digital signal to identify interference characteristics of the at least one uplink RF interference signal; and
generate at least one digital correction signal relative to the at least one uplink RF interference signal based on the identified interference characteristics of the at least one uplink RF interference signal;
wherein the correction path is further configured to convert the at least one digital correction signal into at least one RF correction signal relative to the at least one uplink RF interference signal and provide the at least one RF correction signal to the uplink signal path;
wherein the uplink signal path is further configured to combine the at least one RF correction signal with the uplink RF signal to suppress the at least one uplink RF interference signal in the uplink RF signal to a predetermined level before converting the uplink RF signal in which the at least one uplink RF interference signal is suppressed to the predetermined level into the uplink digital communications signal.

2. The remote unit of claim 1, wherein the digital signal processing circuit comprises interference management circuitry configured to:
receive the uplink digital signal from the correction path;
perform spectrum analysis on the uplink digital signal to identify an interference frequency, an interference amplitude, and an interference phase of the at least one uplink RF interference signal; and
generate the at least one digital correction signal having a correction frequency substantially identical to the interference frequency, a correction amplitude substantially identical to the interference amplitude, and a correction phase substantially opposite of the interference phase.

3. The remote unit of claim 2, wherein the interference management circuitry is further configured to receive information related to the at least one uplink RF communications signal.

4. The remote unit of claim 2, further comprising a coupling circuit configured to couple the uplink signal path and the correction path to an antenna to receive the uplink RF signal.

5. The remote unit of claim 4, wherein the correction path comprises:
a correction path analog-to-digital converter (ADC) configured to convert the uplink RF signal into the uplink digital signal; and
a correction path digital-to-analog converter (DAC) configured to convert the at least one digital correction signal into the at least one RF correction signal.

6. The remote unit of claim 5, wherein the correction path further comprises an attenuator configured to:
receive the uplink RF signal from the coupling circuit;
reduce a peak voltage of the uplink RF signal below a voltage limit of the correction path ADC; and provide the uplink RF signal having the reduced peak voltage to the correction path ADC.

7. The remote unit of claim 5, wherein the uplink signal path comprises:
a signal combiner configured to receive the at least one RF correction signal from the correction path DAC and combine the at least one RF correction signal with the uplink RF signal to suppress the at least one uplink RF interference signal to the predetermined level;
a delay circuit configured to receive the uplink RF signal and provide the uplink RF signal to the signal combiner after a delay period determined to cause the signal combiner to receive the uplink RF signal after receiving the at least one RF correction signal; and
a signal path ADC configured to receive the uplink RF signal from the signal combiner and convert the uplink RF signal into the uplink digital communications signal.

8. The remote unit of claim 7, wherein the digital signal processing circuit further comprises uplink signal processing circuitry configured to:
receive the uplink digital communications signal from the signal path ADC; and
provide a sample of the uplink digital communications signal to the interference management circuitry, wherein the sample of the uplink digital communications signal comprises the at least one uplink RF communications signal and the at least one uplink RF interference signal.

9. The remote unit of claim 8, wherein the interference management circuitry is further configured to:
measure a power level corresponding to the at least one uplink RF interference signal in the uplink digital communications signal;
determine whether the measured power level is greater than the predetermined level; and
adjust correction parameters in response to the measured power level being greater than the predetermined level.

10. The remote unit of claim 9, wherein the interference management circuitry is further configured to adjust the correction phase of the at least one digital correction signal in response to the measured power level being greater than the predetermined level.

11. The remote unit of claim 9, wherein the interference management circuitry is further configured to adjust the correction frequency and the correction amplitude of the at least one digital correction signal in response to the measured power level being greater than the predetermined level.

12. The remote unit of claim 9, wherein the interference management circuitry is further configured to digitally adjust delay of the at least one digital correction signal in response to the measured power level being greater than the predetermined level.

13. The remote unit of claim 9, wherein:
the uplink signal path further comprises a signal path automatic level control (ALC); and
the interference management circuitry is further configured to control the signal path ALC to attenuate the uplink RF signal in response to the measured power level being greater than a predefined power threshold of the signal path ALC.

14. The remote unit of claim 8, further comprising:
a second coupling circuit coupled to the coupling circuit and the antenna;
a signal generator coupled to the second coupling circuit; and
a controller coupled to the signal generator and the digital signal processing circuit, the controller configured to:
configure the remote unit to operate in a test mode by decoupling the second coupling circuit from the antenna; and
control the signal generator to generate a plurality of interference test signals each corresponding to a test signal center frequency and a test signal power level and provide the plurality of interference test signals to the second coupling circuit.

15. The remote unit of claim 14, wherein for each interference test signal among the plurality of interference test signals:
the coupling circuit is further configured to receive the interference test signal from the second coupling circuit and provide the interference test signal to the uplink signal path and the correction path;
the correction path ADC is further configured to convert the interference test signal into a digital interference test signal;
the interference management circuitry is further configured to:
receive the digital interference test signal from the correction path ADC;
perform spectrum analysis on the digital interference test signal to identify a test mode interference frequency, a test mode interference amplitude, and a test mode interference phase of the interference test signal; and
generate a digital correction test signal having a test mode correction frequency substantially identical to the test mode interference frequency, a test mode correction amplitude substantially identical to the test mode interference amplitude, and a test mode correction phase substantially opposite of the test mode interference phase;
the correction path DAC is further configured to convert the digital correction test signal into an analog correction test signal and provide the analog correction test signal to the signal combiner;
the signal combiner is further configured to combine the analog correction test signal with the interference test signal;
the signal path ADC is further configured to convert the interference test signal into a second digital interference test signal;
the uplink signal processing circuitry is further configured to provide a sample of the second digital interference test signal to the interference management circuitry; and
the interference management circuitry is further configured to:
measure an interference power level corresponding to the interference test signal in the second digital interference test signal; and
adjust correction parameters in response to the interference power level of the interference test signal being greater than the predetermined level.

16. The remote unit of claim 15, wherein the interference management circuitry is further configured to adjust the test mode correction phase of the digital correction test signal in response to the measured interference power level of the interference test signal being greater than the predetermined level.

17. The remote unit of claim 15, wherein the interference management circuitry is further configured to adjust the test mode correction frequency and the test mode correction amplitude of the digital correction test signal in response to the measured interference power level of the interference test signal being greater than the predetermined level.

18. The remote unit of claim 15, wherein the interference management circuitry is further configured to digitally adjust delay of the at least one digital correction signal in response to the measured interference power level of the interference test signal being greater than the predetermined level.

19. The remote unit of claim 15, wherein the interference management circuitry is further configured to record the correction parameters in association with the test mode interference amplitude and the test mode interference phase in a storage media.

* * * * *